US011567323B2

(12) United States Patent
Browne

(10) Patent No.: US 11,567,323 B2
(45) Date of Patent: Jan. 31, 2023

(54) PARTIAL ELECTRONIC SEE-THROUGH HEAD-MOUNTED DISPLAY

(71) Applicant: Vision Products, LLC, Los Gatos, CA (US)

(72) Inventor: Michael P. Browne, San Mateo, CA (US)

(73) Assignee: Vision Products, LLC, Los Gatos, CA (US)

( * ) Notice: Subject to any disclaimer, the term of this patent is extended or adjusted under 35 U.S.C. 154(b) by 0 days.

(21) Appl. No.: 16/699,683

(22) Filed: Dec. 1, 2019

(65) Prior Publication Data

US 2021/0168270 A1 Jun. 3, 2021

(51) Int. Cl.
*G02B 27/01* (2006.01)
*G06F 3/01* (2006.01)

(52) U.S. Cl.
CPC .......... *G02B 27/0172* (2013.01); *G06F 3/011* (2013.01); *G02B 27/01* (2013.01); *G02B 27/017* (2013.01); *G02B 27/0149* (2013.01); *G02B 27/0176* (2013.01); *G02B 2027/0123* (2013.01); *G02B 2027/0127* (2013.01); *G02B 2027/0132* (2013.01); *G02B 2027/0138* (2013.01); *G02B 2027/0174* (2013.01); *G02B 2027/0178* (2013.01)

(58) Field of Classification Search
CPC ... G06F 3/011; G02B 27/0172; G02B 27/017; G02B 2027/0138; G02B 2027/0178; G02B 27/0176; G02B 27/01; G02B 2027/0174; G02B 2027/0123; G02B 2027/0127; G02B 2027/0132; G02B 27/0149; G06T 19/006; G06K 9/00671; H04N 13/344; H04N 13/332; H04N 5/2254; A61B 5/6803; A61B 5/0077; A63F 2300/8082
See application file for complete search history.

(56) References Cited

U.S. PATENT DOCUMENTS

| | | | | |
|---|---|---|---|---|
| 3,614,314 A | * | 10/1971 | Rossire | G02B 27/1073 348/42 |
| 4,775,217 A | * | 10/1988 | Ellis | A42B 3/042 313/524 |
| 4,902,116 A | * | 2/1990 | Ellis | A42B 3/042 359/431 |

(Continued)

OTHER PUBLICATIONS

U.S. Appl. No. 15/605,741, filed May 25, 2017, Inventor Michael P. Browne, James A. Davey, Martin Vasquez.

*Primary Examiner* — Michael J Jansen, II
(74) *Attorney, Agent, or Firm* — Fenwick & West LLP

(57) ABSTRACT

A partial electronic see-through HMD includes one or more subassemblies that occlude a central portion of a user's field of view (the peripheral portions of the user's field of view may remain unobstructed). Each subassembly includes an outward facing camera, a display, and an eyepiece. Images of the occluded central zone are captured by the camera and projected to the user via the display and eyepiece. The projected images can also include electronic information, such as AR image overlays. The peripheral zones are not occluded and remain directly viewable by the user. Thus, the projected images complete (or partially complete) the user's FOV of the external environment between the peripheral zones and may provide additional electronic information to the user.

26 Claims, 11 Drawing Sheets

(56) References Cited

U.S. PATENT DOCUMENTS

| | | | |
|---|---|---|---|
| 5,189,512 A * | 2/1993 | Cameron | G02B 27/0172 348/838 |
| 5,903,395 A * | 5/1999 | Rallison | G02B 27/0172 359/630 |
| 6,040,945 A * | 3/2000 | Karasawa | G02B 27/0176 348/E5.145 |
| 6,160,666 A * | 12/2000 | Rallison | G02B 27/283 359/632 |
| 6,560,029 B1 * | 5/2003 | Dobbie | G02B 23/125 2/6.1 |
| 6,937,400 B2 * | 8/2005 | Olsson | A61B 1/00048 359/630 |
| 8,482,859 B2 | 7/2013 | Border et al. | |
| 8,570,242 B2 * | 10/2013 | Chosokabe | G02B 27/017 359/630 |
| 8,867,139 B2 | 10/2014 | Gupta | |
| 8,982,471 B1 | 3/2015 | Starner et al. | |
| 9,101,279 B2 * | 8/2015 | Ritchey | A61B 5/0022 |
| 9,720,231 B2 * | 8/2017 | Erinjippurath | G02B 27/0172 |
| 10,459,254 B2 * | 10/2019 | Antaki | G02B 27/0093 |
| 10,989,924 B2 * | 4/2021 | Han | G02B 27/0176 |
| 11,024,082 B2 * | 6/2021 | Lee | G02B 27/0172 |
| 2002/0089469 A1 * | 7/2002 | Cone | G02B 27/0176 345/8 |
| 2010/0321409 A1 * | 12/2010 | Komori | G06F 3/011 345/656 |
| 2011/0248904 A1 * | 10/2011 | Miyawaki | G09G 3/003 345/7 |
| 2011/0248905 A1 * | 10/2011 | Chosokabe | G02B 27/017 345/7 |
| 2011/0250962 A1 * | 10/2011 | Feiner | A63F 13/57 463/31 |
| 2012/0120103 A1 * | 5/2012 | Border | G02B 27/017 345/633 |
| 2014/0085190 A1 * | 3/2014 | Erinjippurath | G02B 27/0172 345/207 |
| 2015/0268473 A1 * | 9/2015 | Yajima | G02B 27/0172 345/633 |
| 2016/0238850 A1 | 8/2016 | Yang | |
| 2016/0328882 A1 * | 11/2016 | Lee | G02B 27/0025 |
| 2017/0068119 A1 * | 3/2017 | Antaki | H04N 5/2258 |
| 2019/0265480 A1 * | 8/2019 | Han | G02B 27/017 |
| 2020/0004052 A1 * | 1/2020 | Antaki | H04N 5/232411 |
| 2020/0111232 A1 * | 4/2020 | Bleyer | G06T 7/564 |
| 2021/0168270 A1 * | 6/2021 | Browne | G02B 27/0172 |

* cited by examiner (Front View)

(Partial Side View)

(Side View)

(Perspective View)

(Front View)

(Front/Side View)

(Side View)

(Side/Rear View)

(Rear View)

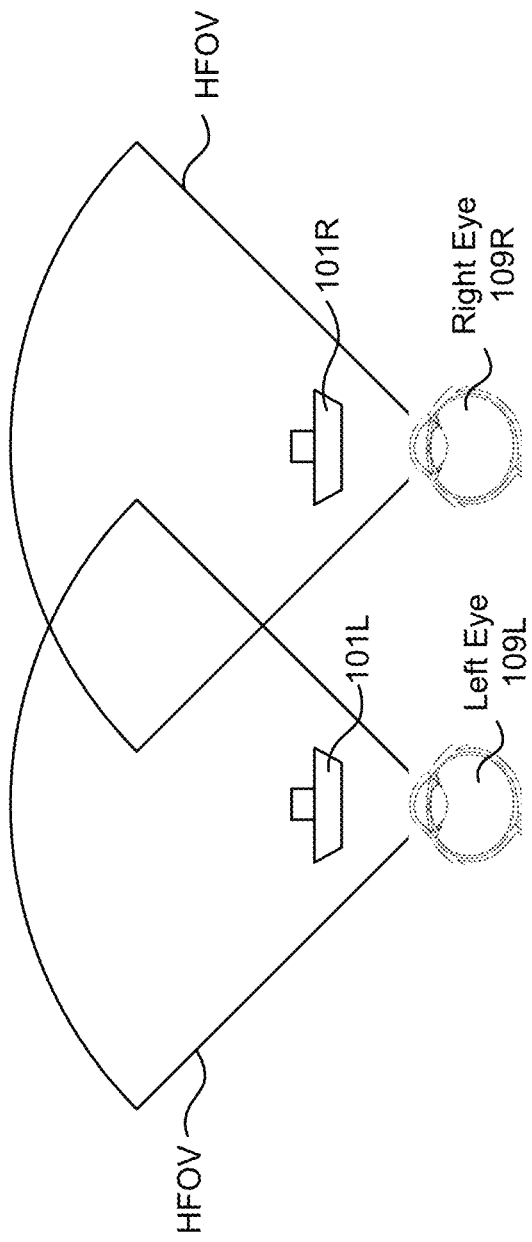
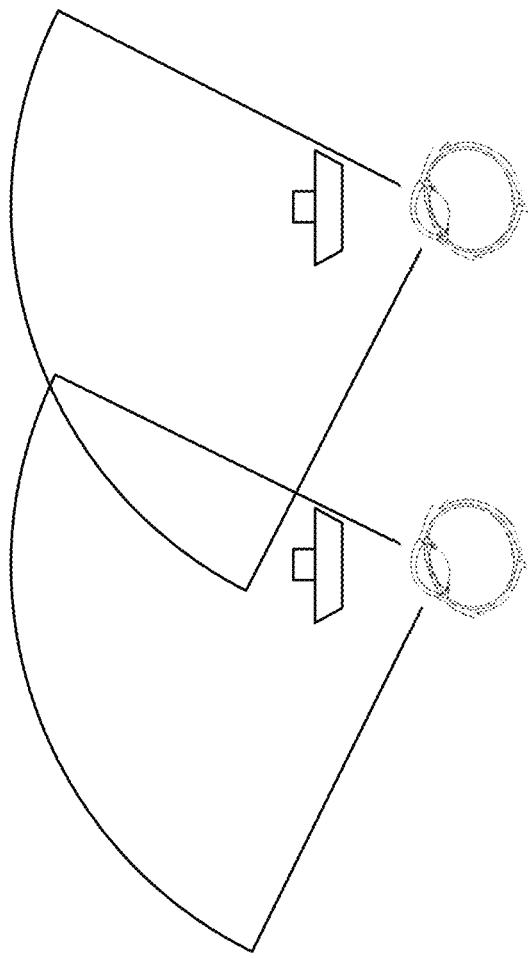
FIG. 4A
FIG. 4B

PARTIAL ELECTRONIC SEE-THROUGH HEAD-MOUNTED DISPLAY

BACKGROUND

1. Technical Field

This disclosure relates generally to head-mounted displays (HMDs), and more particularly, to see-through HMDs.

2. Description of Related Art

Head-mounted displays (HMDs) are display devices worn on the heads of users and can display augmented reality (AR) or virtual reality (VR) images. HMDs are used in a variety fields, including gaming, engineering, medicine, and aviation.

Optical see-through HMDs (also referred to as transparent HMDs) overlay electronic information onto a view of the user's external environment. These HMDs include a beam combiner that optically combines light from the external environment with light from a display. However, optical see-through HMDs have demanding luminance requirements when used in high brightness ambient environments (e.g., outdoors on sunny days). It may also be difficult to match the brightness of the display with the brightness of the external environment, especially if the brightness of the external environment changes rapidly. Thus, see-through HMDs are susceptible to light from the external environment washing out or overpowering light from the display, or light from the display overpowering light from the external environment. In addition, the contrast provided by see-through HMDs can be limited due to light from the external environment. This can make it hard to discern a sufficient number of grey shades in the electronic information to make it look realistic. Furthermore, since light from the external environment is combined with light from the display via the beam combiner, images from the display can appear transparent or translucent. This transparency or translucency can also reduce the realism of the images, and therefore degrade user experience.

Conversely, electronic see-through HMDs (also referred to as video see-through HMDs) occlude a user's entire field of view (FOV) and use outward facing cameras to display images of the external environment to the user. Due to this complete occlusion, electronic see-through HMDs do not suffer from the disadvantages described with respect to optical see-through HMDs. However, since a user's FOV is limited to the images displayed by the HMD, the user's peripheral vision of the external environment is often reduced or limited. This reduction in FOV can limit a user's ability to operate in the external environment.

SUMMARY

The present disclosure overcomes the limitations of the prior art by describing a partial electronic see-through HMD with a large amount of peripheral vision. The HMD includes one or more subassemblies that occlude the central portion of a user's field of view (the peripheral portions of the user's field of view may remain unobstructed). Each subassembly includes an outward facing camera, a display, and an eyepiece. Images of the occluded central zone are captured by the camera and projected to the user via the display and eyepiece. The projected images can also include electronic information, such as AR image overlays, symbology, information, and text. The peripheral zones are not occluded and remain directly viewable by the user. Thus, the projected images complete (or partially complete) the user's FOV of the external environment between the peripheral zones and may provide additional electronic information to the user.

Thus, the partial electronic see-through HMD provides benefits of both electronic see-through HMDs and optical see-through HMDs. In particular, electronic information may be overlaid onto a digital image of the external environment. This prevents the electronic information from appearing transparent, which would be the case if the electronic information was optically combined with light directly from the external environment. In this way, the electronic information may provide complete occlusion, for example, where electronic information, such as solid objects, block objects they are in front of. This occlusion may add to the realism of the displayed image, as it is how users perceive the external environment with their natural vision. Additionally, since the subassembly only partially blocks a user's field of view, the image of the external environment may be displayed without obscuring the user's view of the peripheral portions of the field of view.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 4A-4B illustrate the use of right-eye and left-eye subassemblies, according to some embodiments.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
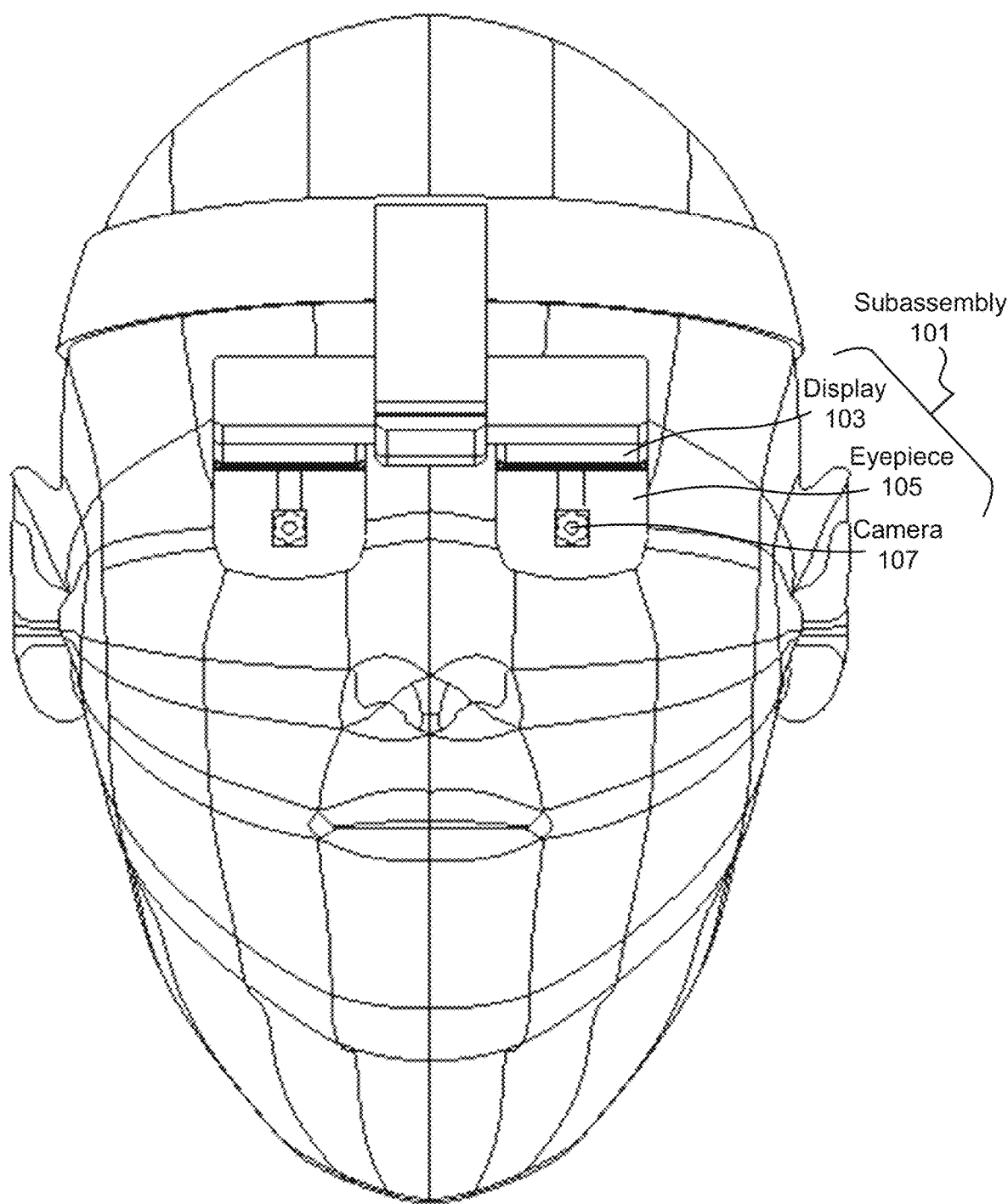
FIGS. 1A-1C illustrate different views of a user wearing a partial electronic see-through HMD, according to some embodiments.
Figure 1B:
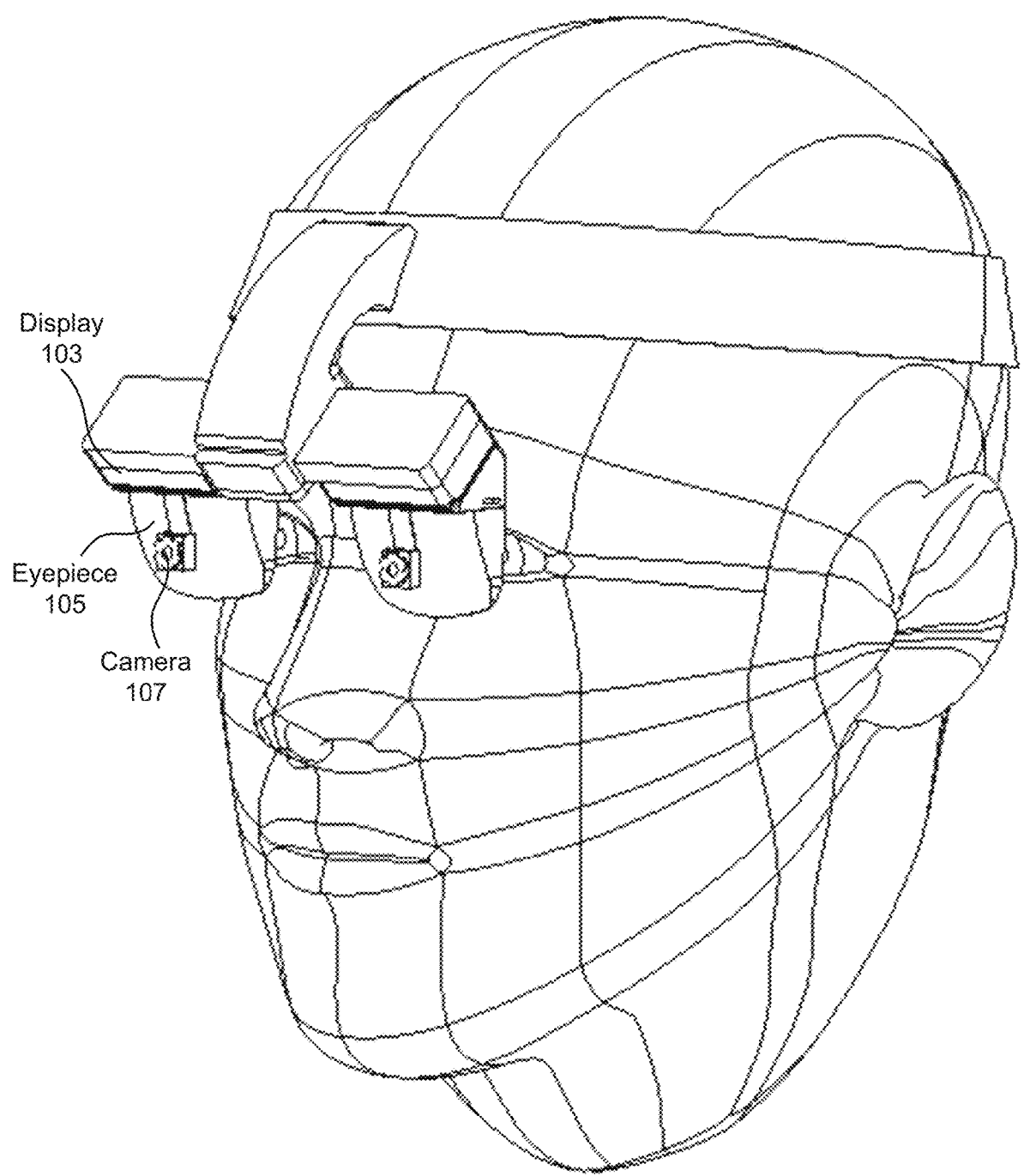
Figure 1C:
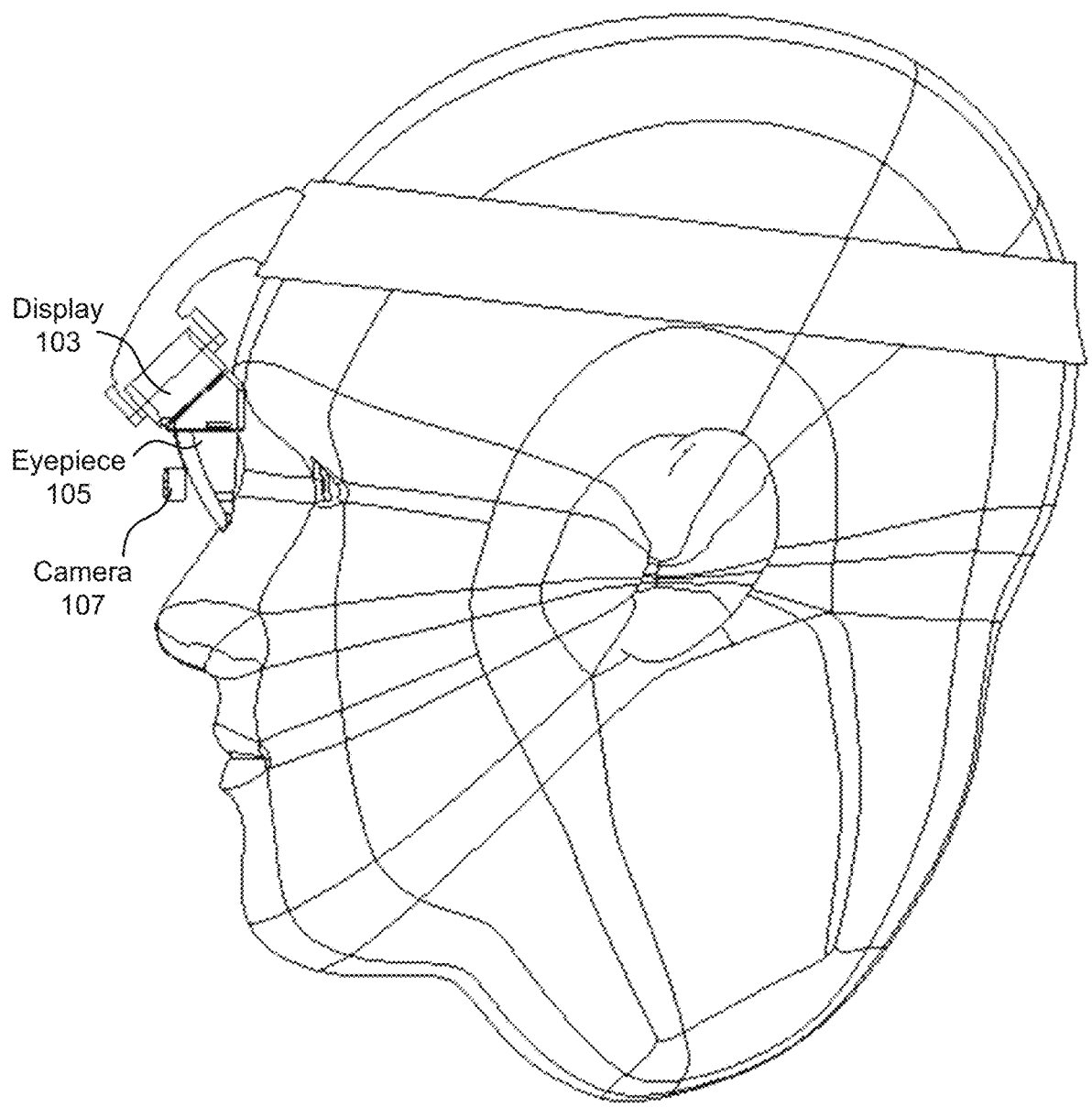
Figure 1D:
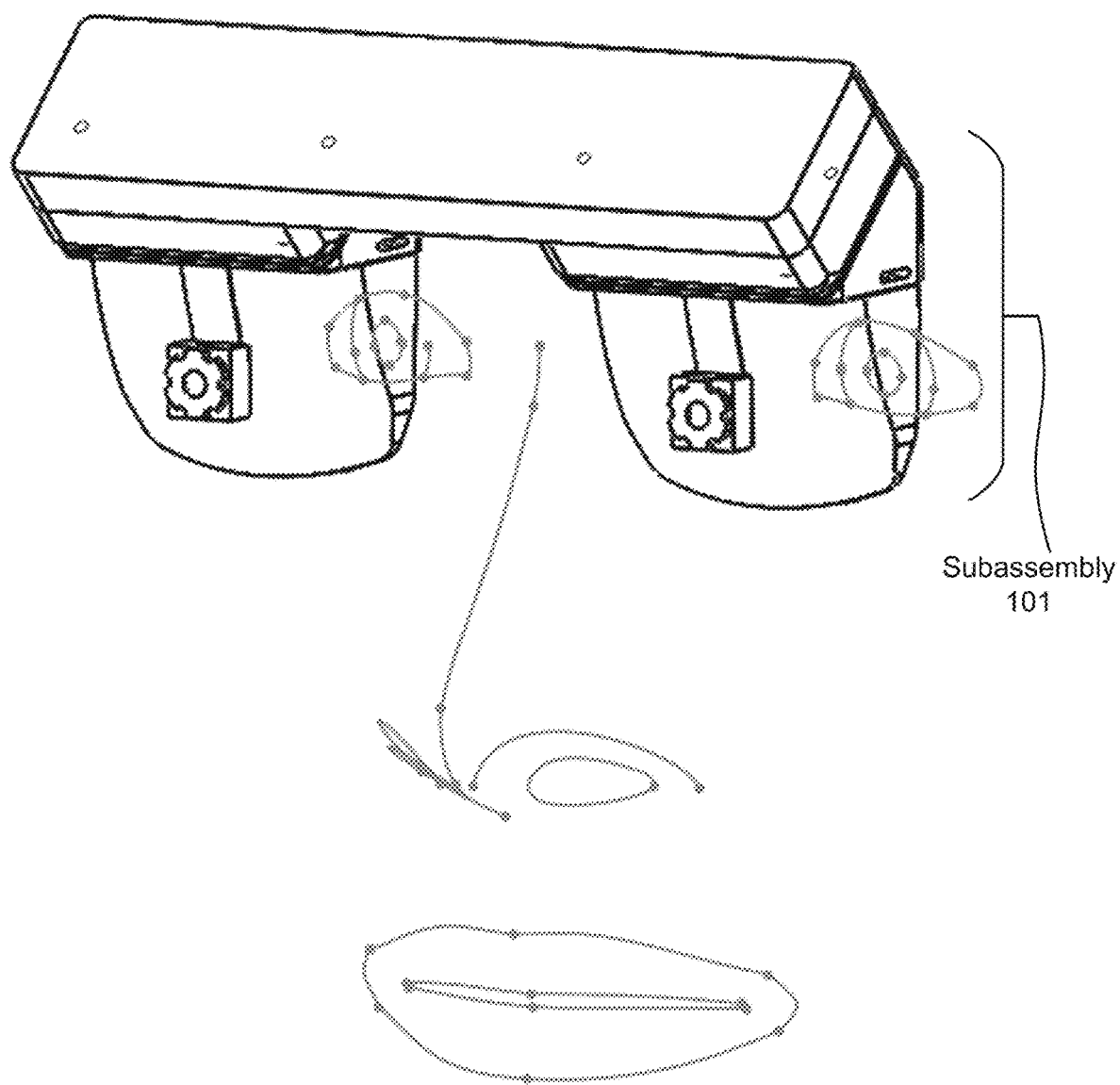
FIGS. 1D-1I illustrate different views of the HMD subassemblies illustrated in FIGS. 1A-1C, according to some embodiments.
Figure 1E:
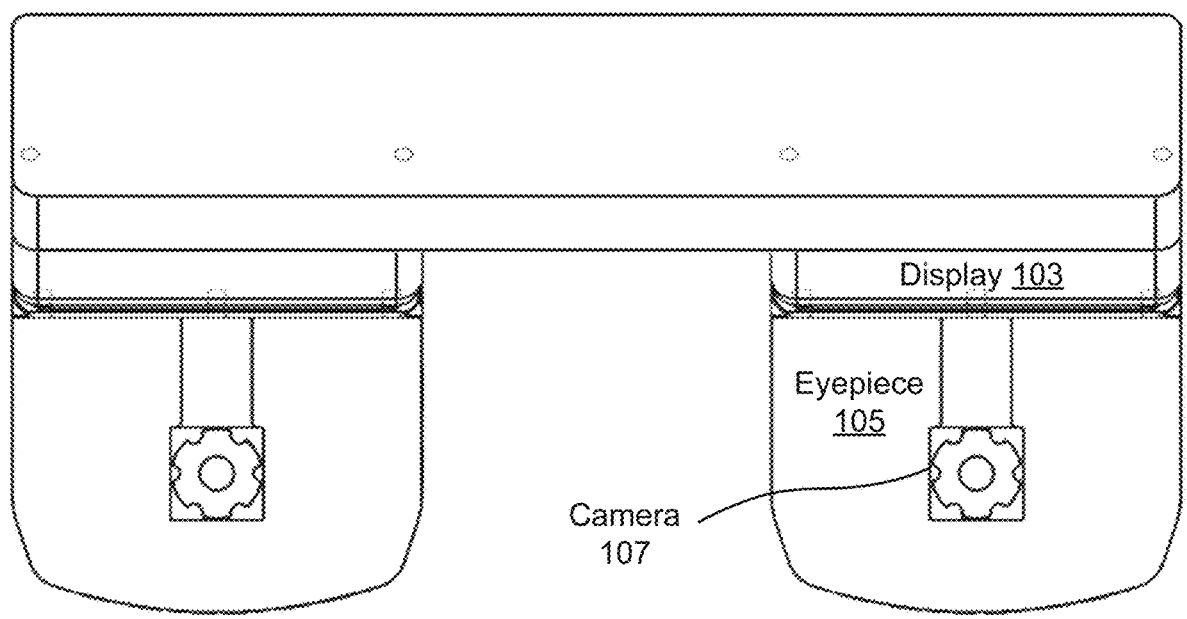
Figure 1F:
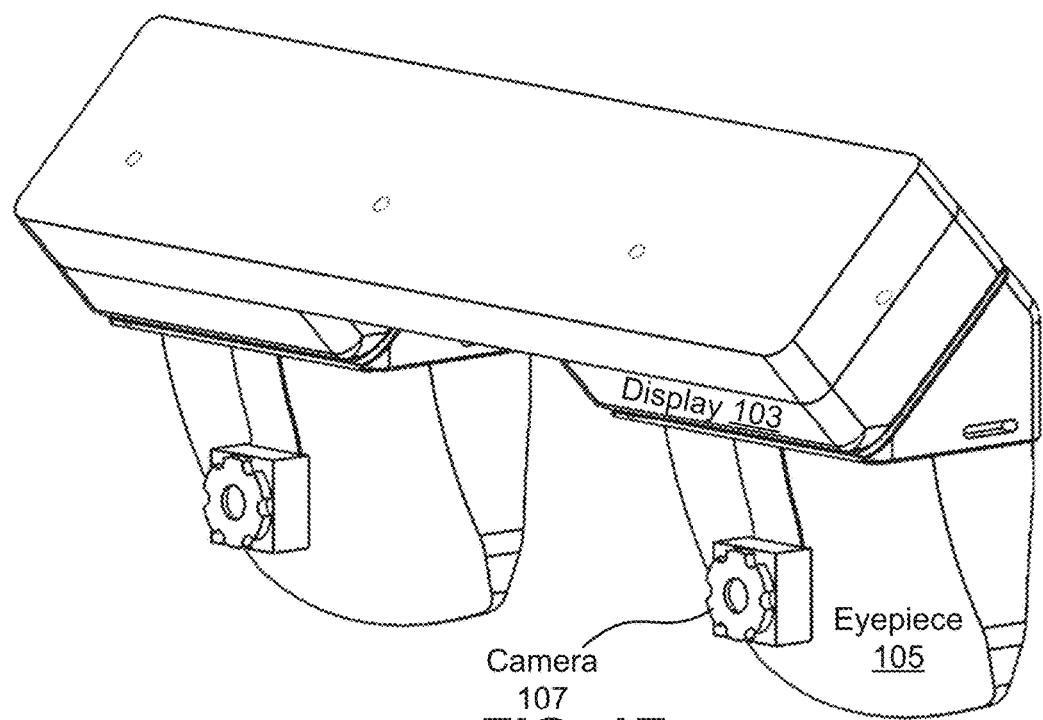
Figure 1G:
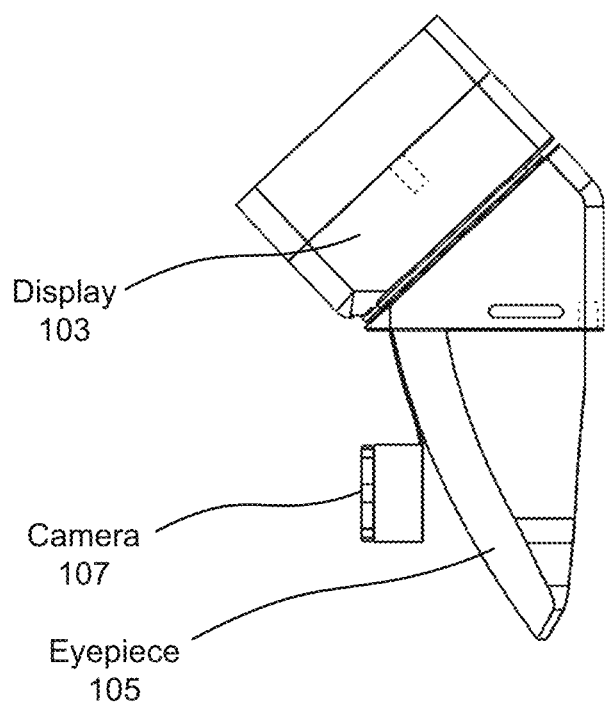
Figure 1H:
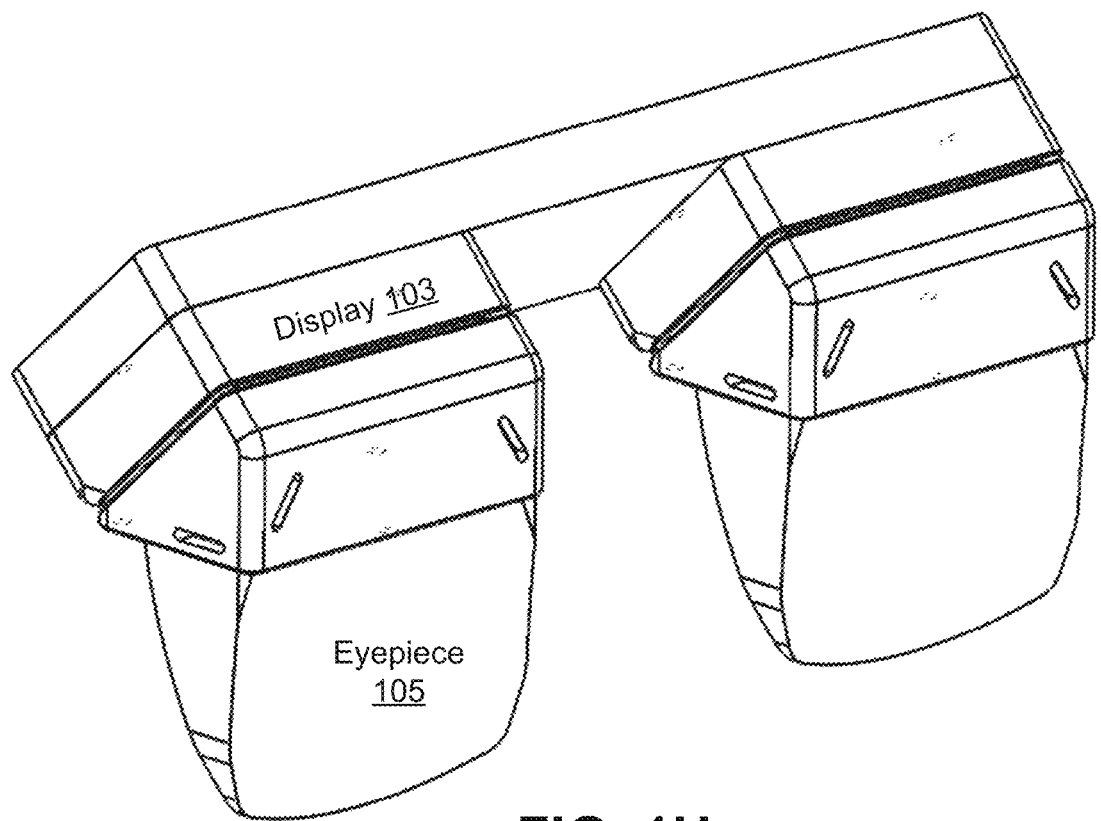
Figure 1I:
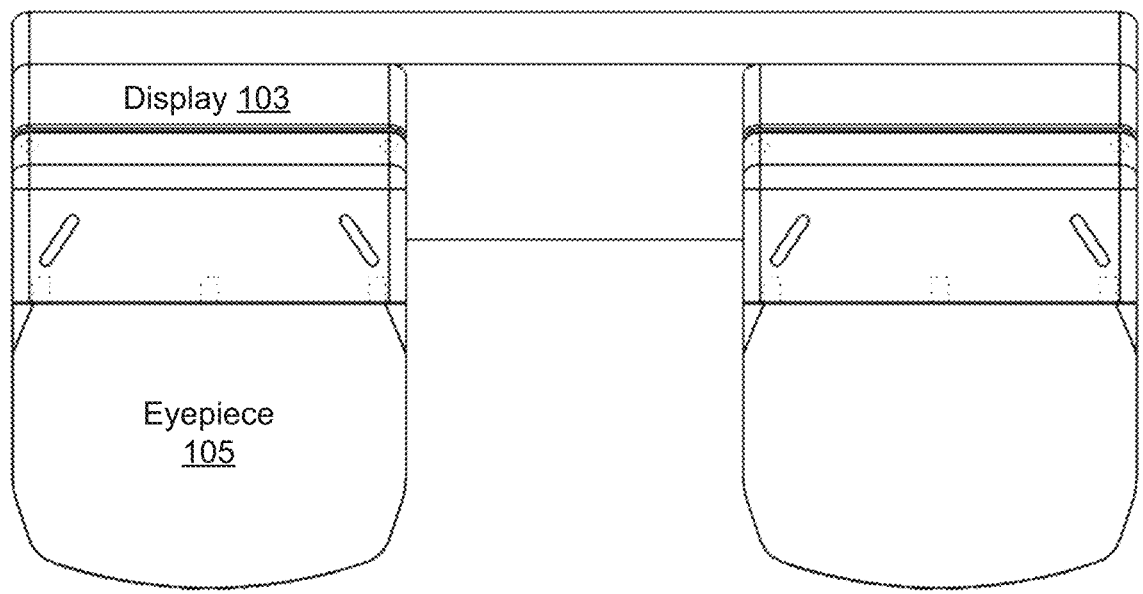

FIGS. 1A-1C illustrate a front view, a partial side view and a full side view of a user wearing a partial electronic see-through HMD, according to some embodiments. The HMD may be mounted to the user's head, for example by a headband or helmet. The HMD includes one or more subassemblies 101 that includes a display 103, an eyepiece 105, and an outward facing camera 107. The eyepiece 105 occludes a central portion of the user's field of view (FOV), but the user may see around the edges of the eyepiece in order to directly view the peripheral zones to each side of the occluded central zone. The camera 107 captures an image of the occluded central zone, and the eyepiece 105 projects this image (or an enhanced version of the image) from the display 103 into the user's eye. Thus, the user views his full field of view as follows. The central portion of the field of view is provided by an electronic image projected via the eyepiece. The peripheral portions of the field of view are directly viewable. The central and peripheral portions preferably are matched in brightness and without gaps, to present a seamless view of the external environment. To achieve this, the subassemblies preferably are designed so that the camera, display and eyepiece provide minimal obstruction to the peripheral parts of the field of view.

FIG. 1 shows an HMD with two subassemblies 101, one for the right eye and one for the left eye, but different numbers of subassemblies may be used. For example, tiling multiple eyepieces and multiple cameras can provide a larger augmented FOV. FIGS. 1D-1I illustrate different views of the subassemblies 101, according to some embodiments. FIG. 1D shows a perspective view of subassemblies 101, with a sketch of the user's facial features. FIGS. 1E-1I show views of the subassemblies 101 as it is rotated from a front view to a rear view. FIG. 1E shows a front view (i.e., looking directly at the user), FIG. 1F shows a view from the front and to the side, FIG. 1G shows a side view, FIG. 1H shows a view from the rear and to the side, and FIG. 1I shows a rear view.

Figure 2A:
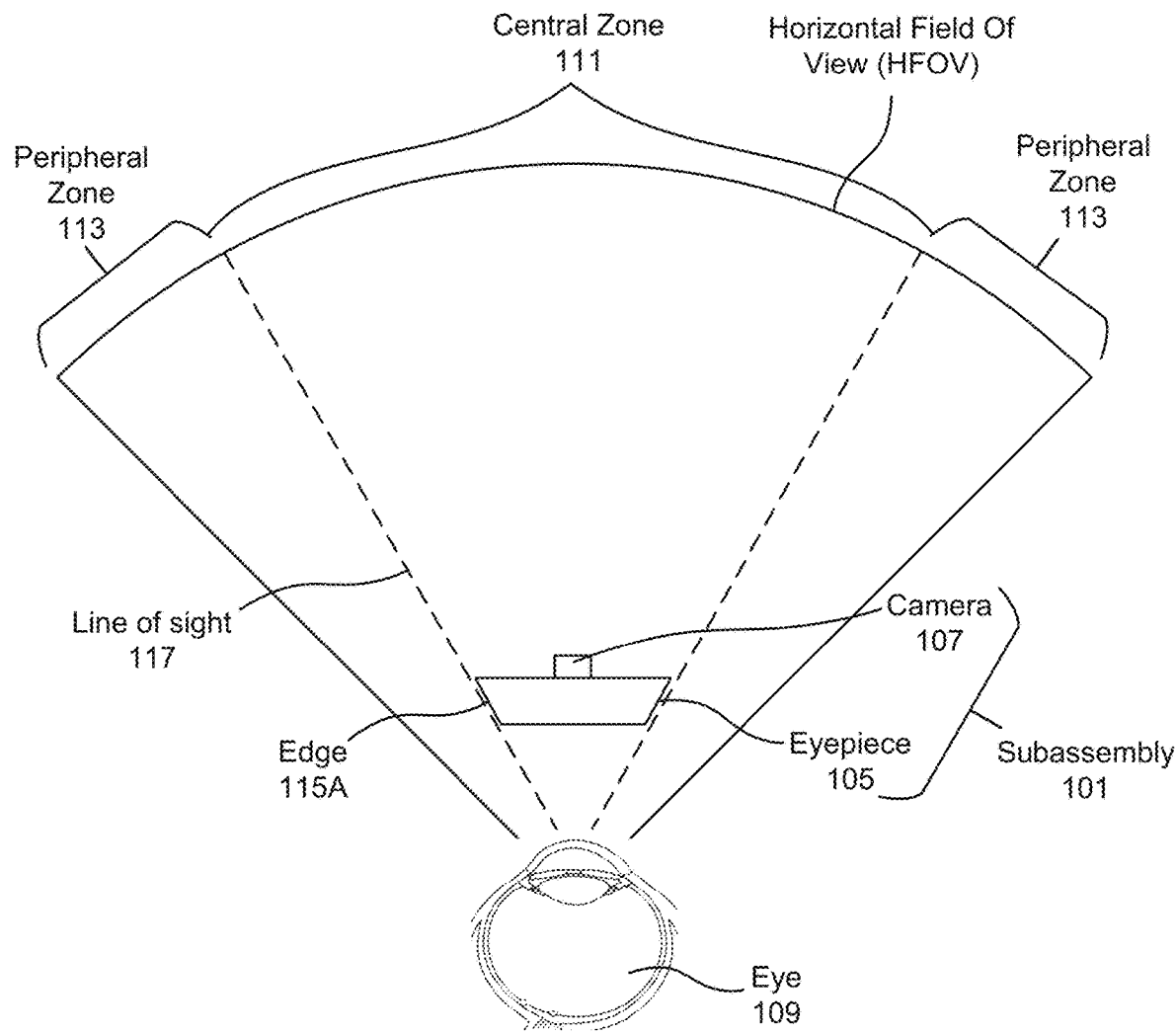
FIG. 2A illustrates a plan view of a subassembly occluding a portion of an eye's horizontal field of view (HFOV), according to an embodiment.
Figure 2B:
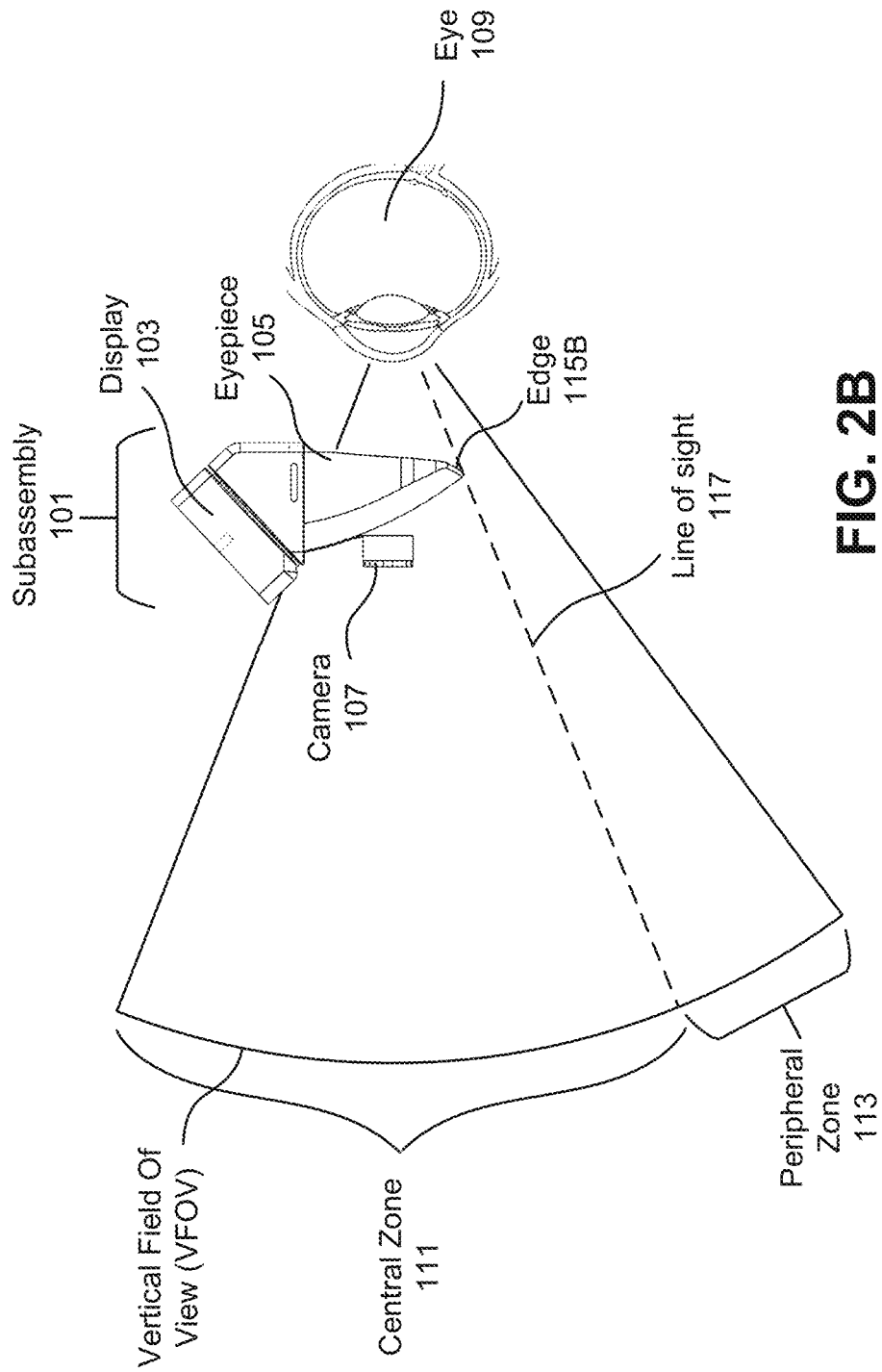
FIG. 2B illustrates a side view of the subassembly occluding a portion of the eye's vertical field of view (VFOV), according to an embodiment.

Subassemblies 101 are further described with reference to FIGS. 2A-4B. FIG. 2A shows a plan view of a subassembly 101, illustrating that the eyepiece 105 occludes a portion of an eye's horizontal FOV (HFOV), according to an embodiment. FIG. 2B shows a side view of the subassembly 101, illustrating that the eyepiece 105 occludes a portion of the eye's vertical FOV (VFOV), according to an embodiment.

The eyepiece 105 occupies a portion of the eye's FOV because the image projected by the eyepiece will occupy this portion of the eye's FOV. This portion of the eye's FOV is referred to as the central zone 111. In some embodiments, the central zone 111 has a diagonal FOV of 62 degrees. The central zone 111 may have a diagonal FOV of at least 10 degrees (the usefulness of the HMD may decrease for smaller FOVs). In another example, the central zone has a monocular HFOV of 53 degrees (a human eye may have a total monocular HFOV of 120 degrees) and a monocular VFOV that provides the user with a peripheral portion below the eyepiece that is 16.5 degrees (a human eye may have a total monocular VFOV of 80 degrees). The central zone occlusion prevents the eye 109 from directly viewing objects in an external environment within the central zone 111. In some cases, this may protect the user's eye 109 from bright light sources, such as lasers, in the central zone 111 since there is no direct vision path to the eye 109.

The remaining viewable portions of the FOV are referred to as the peripheral zones 113. Typically, the eye 109 can directly view the peripheral zones 113 of the external environment that are to the sides of and below the central zone 111. However, as shown in FIG. 2B, the display 103 is above the eyepiece and the top of the subassembly 101 is mounted to the HMD. Thus, in these embodiments, the peripheral zone above the central zone 111 may not be viewable. In FIG. 2A, the peripheral zones 113 are equal in size. This is not required though. In some cases, the eyepiece 105 is shifted laterally so that one peripheral zone 113 is larger than the other.

When designing the HMD, it may be advantageous to increase the size of the horizontal peripheral zones and the peripheral zone below the subassembly 101, while reducing the peripheral zone above the subassembly 101, in order to increase the total viewable FOV for the user. In addition, users already have a limited VFOV in the upward direction due to their eyebrows, forehead, and possibly a helmet or other HMD support device. Additionally, users are typically more concerned about objects in front of, to the sides, or below them.

Since the subassembly 101 is generally stationary relative to the user's head, the eyepiece 105 blocks different portions of the eye's FOV as the eye 109 moves. The location of the subassembly 101 relative to the user's head and the dimensions of the subassembly 101 also determine the location and size of the central zone 111.

As stated above, the subassembly 101 includes a display 103, an eyepiece 105, and an outward facing camera 107. These components are further described below. The camera 107 is pointed away from the user's eye 109 to capture images of the external environment in front of the user. The camera 107 captures images with a FOV that at least includes the central zone 111 (otherwise the displayed image may not complete the user's FOV). The camera 107 may be behind the eyepiece 105 and the camera dimensions (e.g., width and height) may be smaller than the eyepiece 105 so that the eye 109 cannot see the camera 107. That is, the camera 107 does add further occlusion beyond that of just the eyepiece. The camera 107 may be aligned to have a same line of sight as the eye 109. Said differently, the camera 107 may be aligned with the user's line of sight when the user is looking at the center of the eyepiece 105. However, this alignment is not required. For example, the camera can be offset in the temporal direction to reduce any obscuration seen by the opposite eye. In addition to capturing images that will be displayed to the user, images from the camera can be used for head, body, and hand tracking. It is desirable for the camera to have a resolution and a bit depth that provides a reasonably good image of the external environment.

The display 103 displays images (e.g., a video) that are projected by the eyepiece 105 to the eye 109 in real-time or near real-time. The projected images may include images captured by the camera 107 to complete the user's FOV (e.g., see FIG. 3 and related description). In some cases, the images may be VR images or symbology (e.g., generated by an external computer). In some embodiments, the camera optics and the eyepiece optics introduce distortion and other undesired image artifacts. These may be accounted for by predistorting or reversing the distortion in the image on the display 103 (e.g., using an external computer). In other embodiments, the camera optics may be designed to cancel out the eyepiece optics, or vice versa. By displaying images, the display enables the HMD to display high contrast images and enables a user to operate in external environments with high ambient light.

The eyepiece 105 is an optical component that projects light from the display 103 to the eye 109. For example, the eyepiece 105 may be a compact, freeform, frameless prism eyepiece. Other examples of eyepieces 105 include compact waveguide eyepieces, conventional spherical or aspheric eyepieces, polarization-based "pancake optics" or other freeform optical systems. The eyepiece 105 may completely or partially prevent light in the central zone 111 from entering the eye 109. For example, outward facing surfaces of the eyepiece 105 may be opaque. The distance between the eyepiece 105 and the eye (referred to as the eye relief)

may be at least 12 millimeters. To account for movement of the HMD on the user's head, the eyepiece 105 may have an eyebox of at least 6 millimeters.

Figure 3:
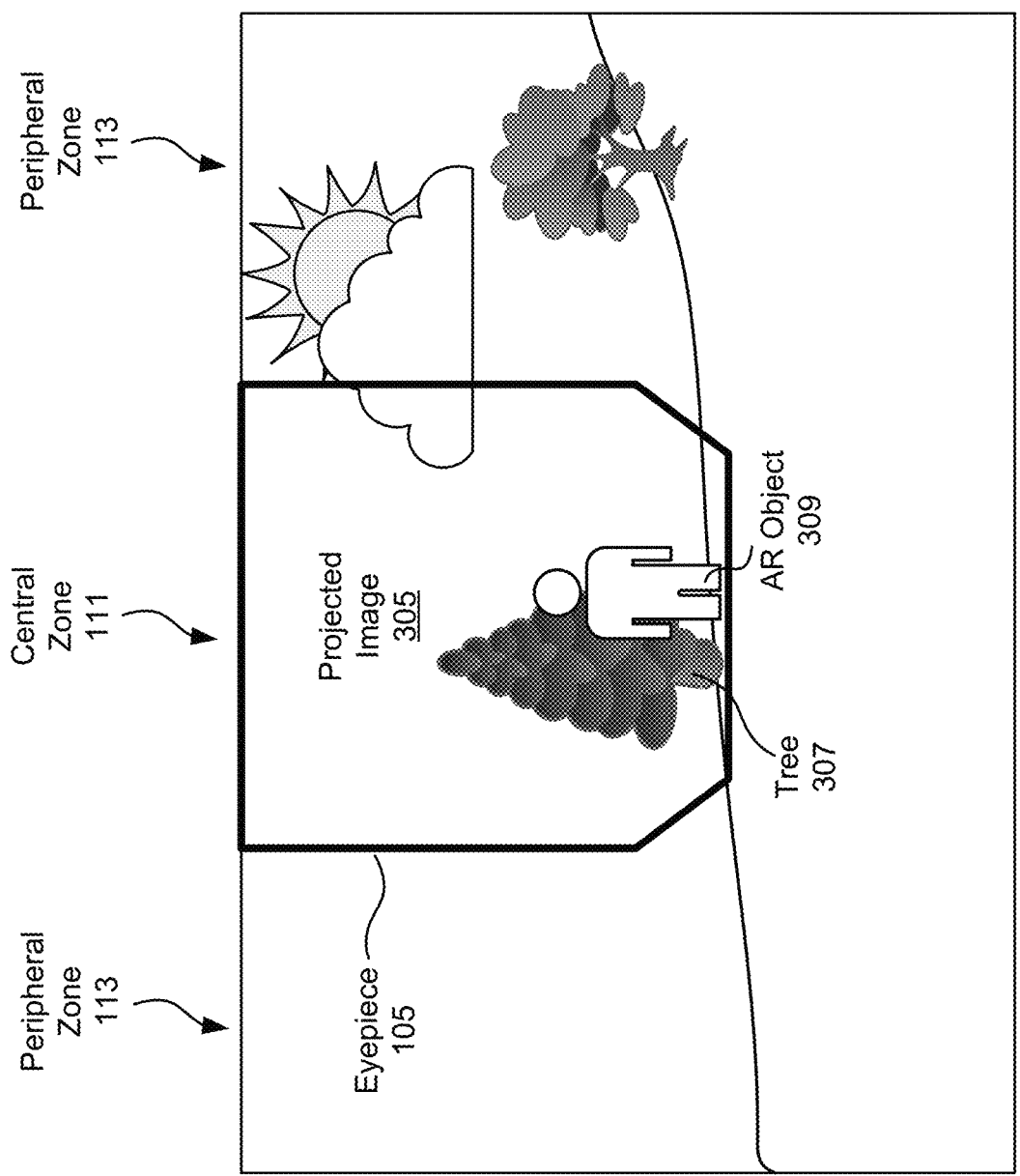
FIG. 3 is a scene of an external environment as viewed by the eye, according to an embodiment.

FIG. 3 is a scene of the external environment as viewed by the eye 109, according to an embodiment. The scene includes a central zone 111, which is marked by the heavy border, and peripheral zones 113 that partially surround the central zone 111. The central zone 111 is the portion of the FOV occluded by the eyepiece 105. Thus, objects behind the eyepiece 105 (e.g., the tree 307) cannot be directly seen by the eye 109. Although the central zone 111 of the FOV is occluded, the eyepiece 105 projects an image 305 of the central zone 111. The projected image 305 is recorded by a camera 107 hidden behind the eyepiece 105. The projected image 305 completes the FOV of the external scene, for example, so that an image of the tree 307 is presented to the eye 109. Thus, the HMD allows the user to view a digital representation of the external environment (through the eyepiece) without the HMD blocking peripheral zones of the eye's FOV. For example, while wearing the HMD, the user can look below the eyepiece to see their body or equipment such as a desktop, mouse, or joystick. In another example, the user can directly see their feet while walking, which may be important for safe locomotion.

In some embodiments, a video processor or computer predistorts the imagery to compensate for the camera lens distortion and/or the eyepiece distortion. In another embodiment, the camera lens distortion balances the eyepiece distortion, where, for example, the eyepiece 105 has negative distortion (barrel distortion) and the camera lens is designed with positive (pincushion) distortion to balance it out.

For initial alignment, the camera 107 may be mechanically aligned to the eyepiece 105 using mechanical fiducials or measurements from the camera 107 to the eyepiece 105 or its housing. Once that is complete, fine alignment can be performed in a number of ways. For example, the camera imagery can be shifted electronically on the camera. The display imagery can also be electronically shifted on the microdisplay. If a video processor or computer is used, it can digitally shift the imagery to align it with the real world. It is desirable for the camera to be rigidly held with respect to the eyepiece 105, so that the camera 107 does not shift over time or as the user moves around. Initial alignment of the camera can also be done electronically.

The projected images 305 may be enhanced images compared to the images captured by the camera 107. In some embodiments, the projected images 305 include electronic information overlaid on the image, such as AR information (e.g., avatars, symbology, structures, etc.). For example, AR image object 309 is overlaid onto an image of the central zone 111. Since the projected image 305 is a digital image, the AR object 309 does not appear washed out or transparent compared to real objects in the external environment. Conversely, as described in the background, if the AR object 309 was displayed by a conventional optical see-through HMD, portions of the tree 307 behind the AR object 309 would be visible, and therefore, the AR object 309 would appear transparent, appear semi-transparent, and/or rendered with low contrast.

Alternatively or additionally, enhanced images may be processed images that make them easier for the user to view. For example, image filters (e.g., noise reduction, sharpening, blurring, etc.) may be applied to the captured images. In another example, the image brightness and contrast is adjusted so that the projected image 305 has a brightness similar to the brightness of natural light from the external environment. This can be done manually or automatically e.g., via an ambient light sensor.

To reduce the visibility of the boundary between the projected image 305 and the peripheral zones 113, the physical dimensions of the eyepiece 105 (e.g., width (in the horizontal direction) and the length (in the vertical direction)) may be approximately similar to the dimensions of the eyepiece FOV. Additionally, it is desirable to reduce or eliminate mechanical structures on sides of the eyepiece 105. In some cases, the eyepiece 105 includes a thin frame on one or more edges 115 for mechanical support (e.g., less than 3 or 1 millimeter). In the examples of the FIGS. 2A-2B, the lateral edges 115A and the bottom edge 115B of the eyepiece 105 are frameless. Furthermore, to reduce the visibility of the edges 115 of the eyepiece 105, the edges may be tapered so that they do not protrude into the user's line of sight 117. An edge 115 may also be referred to as a side of the eyepiece 105.

FIGS. 4A-4B illustrate the use of right-eye and left-eye subassemblies, according to some embodiments. FIG. 4A illustrates a left subassembly 101L in front of the left eye 109L and a right subassembly 101R in front of the right eye 109L. The HFOV of each eye is also indicated. FIG. 4B is similar to FIG. 4A, except the user is looking to the left. While the subassemblies 101 are located at a same location relative to each eye 109, this is not required. For example, the location of the left subassembly 101L may be shifted in a nasal or temporal direction compared to the location of the right subassembly 101R. By shifting both subassemblies 101 in a temporal direction, obscurations by the camera and eyepiece to an opposite eye can be reduced. That is, shifting the right-eye subassembly to the right will reduce its obscuration of the left eye's FOV.

In some embodiments, the subassemblies are designed so that an eye 109 cannot "see" components of the other eye's subassembly 101, even when looking in that direction. For example, as illustrated in FIG. 4B, despite the right eye 109R looking in the nasal direction (i.e., to the left), the right eye 109R does not see the left-eye subassembly 101L.

In other embodiments, depending on the dimensions and locations of the subassembly components, an eye 109 may be able to see one or more components of an opposite subassembly 101. For example, an eye 109 may not be able see the eyepiece 105 but may be able to see the camera 107 and/or display 103 of the opposite subassembly 101. In another example, the eye 109 may not be able to see the camera 107 but may be able to see the display 103 of the opposite subassembly 101. In some embodiments, an eye 109 may not be able to see an opposite subassembly 101 if the eye looks forward, but it may be able to see one or more components of the opposite subassembly if the eye looks in the nasal direction. For example, the left-eye subassembly may block part of the right eye's FOV. However, the left eye 109 may see the part of the external environment that is blocked from the right eye's FOV. In such a way, obscurations to the binocular FOV may be reduced or eliminated. Thus, the peripheral zones and central zones of the right subassembly and the left subassembly may provide a continuous binocular field of view to the user. For example, the subassemblies result in monocular obscurations but do not result in binocular obscurations. In some embodiments this is only the case in the HFOV.

Reducing or eliminating the visibility of an opposite subassembly 101 by an eye allows the user to view a larger portion of the external environment. Thus, the dimensions and locations of a subassembly 101 may be based on the locations and FOVs of each eye 109. In some cases, the visibility of a subassembly 101 is related to its forward projection (i.e., the thickness of the subassembly away from the eye). Subassemblies 101 with forward projections that are too large may eliminate or significantly reduce peripheral zones 113 in the nasal direction. For example, for certain fields of view, if the thickness of the eyepiece 105 is larger than 1.5 inches or the combined thickness of the eyepiece 105 and the camera is more than 2.5 inches, then the subassembly 101 may have a forward projection that induces a binocular obscuration where neither eye 109 can see a portion of the external environment within a field of view.

In some embodiments, to reduce the visibility of an opposite subassembly 101, the camera 107 is offset in the temporal direction to reduce the portion of the opposite subassembly 101 seen by the eye 109. In these embodiments, despite being offset, the camera 107 may have a lens wide enough to capture the entire central zone 111.

Although the detailed description contains many specifics, these should not be construed as limiting the scope of the invention but merely as illustrating different examples. It should be appreciated that the scope of the disclosure includes other embodiments not discussed in detail above. For example, although the HMD was described as a binocular system, the described concept will work for a monocular system as well. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components illustrated and described can include any electronics and/or computer instructions that may be embodied in digital or analog circuits. This may be implemented using any one or more of application specific integrated circuits (ASICs), field-programmable gate arrays (FPGAs), and general-purpose computing circuits, along with corresponding memories and computer program instructions for carrying out the described operations. The specifics of these components are not shown for clarity and compactness of description.

What is claimed is:

1. A head mounted display comprising:
   an eyepiece that occludes a central zone of a field of view of a user's eye, wherein an external environment in peripheral zones to left and right sides of the central zone remains directly viewable by the user's eye, the eyepiece including a first surface facing the user's eye and a second surface different than the first surface, the second surface forming a lateral side of the eyepiece and being tapered along a line of sight of the user's eye, the eyepiece further including a third surface opposite the first surface and facing away from the user's eye, the third surface being opaque to occlude the central zone;
   a camera that captures an image of the external environment in the occluded central zone; and
   a display that displays the image or an image of the occluded central zone that is based on the image captured by the camera, wherein the eyepiece projects the image from the display into the user's eye, the projected image spanning the field of view of the user's eye between the peripheral zones and providing an image of the external environment vertically aligned to the eye's view of the external environment in the peripheral zones along at least one side of the central zone.

2. The head mounted display of claim 1, wherein the camera is within the central zone such that the user's eye cannot see the camera.

3. The head mounted display of claim 1, wherein the camera is aligned with the user's line of sight when the user's eye is looking at the eyepiece.

4. The head mounted display of claim 1, wherein a peripheral zone below the central zone is directly viewable by the user's eye, and the projected image spans the field of view of the user's eye between (1) the peripheral zones to the left and right sides of the central zone and (2) the peripheral zone below the central zone.

5. The head mounted display of claim 1, wherein the central zone has a diagonal field of view that is at least 10 degrees.

6. The head mounted display of claim 1, wherein the eyepiece is frameless on two lateral sides.

7. The head mounted display of claim 1, wherein the eyepiece is frameless on a bottom side.

8. The head mounted display of claim 1, wherein the eyepiece includes a frameless prism.

9. The head mounted display of claim 1, wherein the eyepiece includes a frame on one or more sides that is less than 3 millimeters wide.

10. The head mounted display of claim 9, wherein the frame is less than 1 millimeter wide.

11. The head mounted display of claim 1, wherein the eyepiece is not more than 1.5 inches thick along an axis directed away from the user's eye.

12. The head mounted display of claim 1, wherein a thickness as measured from the eyepiece to the camera is not more than 2.5 inches.

13. The head mounted display of claim 1, wherein the projected image is the same as the image captured by the camera.

14. The head mounted display of claim 1, wherein the projected image is an enhanced image compared to the image captured by the camera.

15. The head mounted display of claim 1, wherein the eyepiece has an eye box of at least 6 millimeters.

16. The head mounted display of claim 1, wherein the head mounted display has an eye relief of at least 12 millimeters.

17. The head mounted display of claim 1, wherein a brightness of the projected image matches a brightness of light from the peripheral zones.

18. The head mounted display of claim 1, wherein a peripheral zone on one side of the central zone is larger than a peripheral zone on an opposite side of the central zone.

19. The head mounted display of claim 1, wherein to provide an image of the external environment vertically aligned to the eye's view of the external environment in the peripheral zones along at least one side of the central zone, the image from the display is distorted to compensate for at least one of: camera lens distortion or eyepiece distortion.

20. The head mounted display of claim 1, wherein to provide an image of the external environment vertically aligned to the eye's view of the external environment in the peripheral zones along at least one side of the central zone, image distortion of the eyepiece compensates for lens distortion of a lens of the camera.

21. The head mounted display of claim 20, wherein the eyepiece includes a barrel distortion, and the camera lens includes a pincushion distortion.

22. The head mounted display of claim 1, wherein the camera is offset in a temporal direction such that an opposite eye of the user cannot see the camera.

23. A binocular head mounted display comprising:
a right subassembly and a left subassembly, each subassembly comprising:
an eyepiece that occludes a central zone of a field of view of a user's eye, wherein an external environment in peripheral zones to left and right sides of the central zone remains directly viewable by the user's eye, the eyepiece including a first surface facing the user's eye and a second surface different than the first surface, the second surface forming a lateral side of the eyepiece and being tapered along a line of sight of the user's eye, the eyepiece further including a third surface opposite the first surface and facing away from the user's eye, the third surface being opaque to occlude the central zone;
a camera that captures an image of the external environment in the occluded central zone; and
a display that displays the image or an image of the occluded central zone that is based on the image captured by the camera, wherein the eyepiece projects the image from the display into the user's eye, the projected image spanning the field of view of the user's eye between the peripheral zones and providing an image of the external environment vertically aligned to the eye's view of the external environment in the peripheral zones along at least one side of the central zone.

24. The binocular head mounted display of claim 23, wherein the display and camera of the left subassembly cannot be seen by the user's right eye and the display and camera of the right subassembly cannot be seen by the user's left eye.

25. The binocular head mounted display of claim 23, wherein the peripheral zones and central zones of the right subassembly and the left subassembly provide a contiguous binocular field of view to the user.

26. The binocular head mounted display of claim 23, wherein the camera of the left subassembly is within the central zone of the left eye such that the user's left eye cannot see the camera and the camera of the right subassembly is within the central zone of the right eye such that the user's right eye cannot see the camera.

* * * * *